Figure 1:
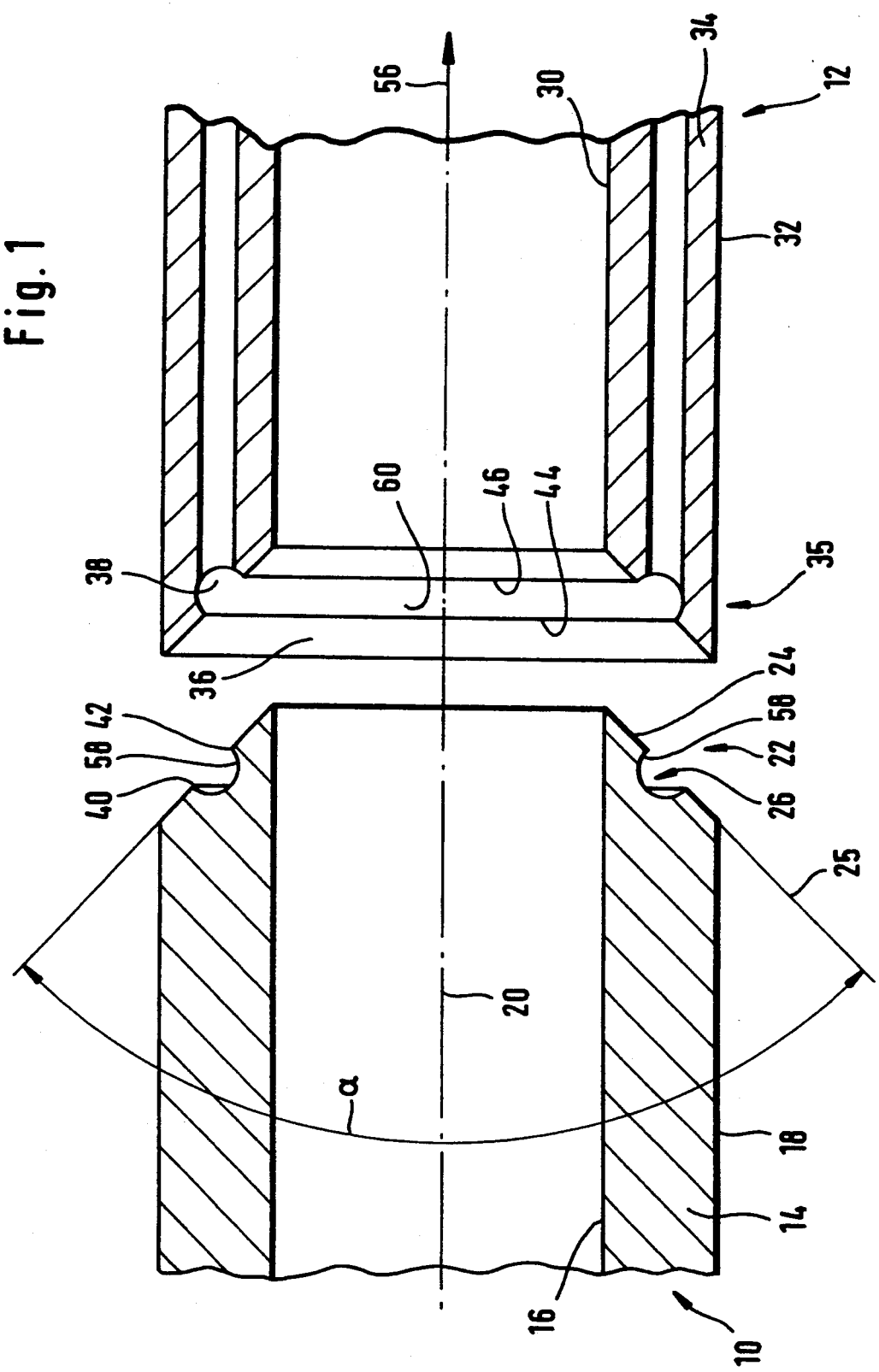

United States Patent [19]
Kocian

[11] Patent Number: 5,403,045
[45] Date of Patent: Apr. 4, 1995

[54] JOINT CONNECTION

[75] Inventor: Frank Kocian, Neckartailfingen, Germany

[73] Assignee: Deutsche Forschungsanstalt fuer Luft- und Raumfahrt e.V., Bonn, Germany

[21] Appl. No.: 62,455

[22] Filed: May 11, 1993

[30] Foreign Application Priority Data

May 13, 1992 [DE] Germany .......... 42 15 651.3

[51] Int. Cl.⁶ ............................................. F16L 13/00
[52] U.S. Cl. .................................. 285/284; 285/294; 285/297; 403/265
[58] Field of Search .............. 285/284, 294, 297; 403/265, 266

[56] References Cited

U.S. PATENT DOCUMENTS

| 170,473 | 11/1875 | Flagler et al. | 285/294 |
| 615,976 | 12/1898 | Felsche | 285/294 |
| 935,376 | 9/1909 | Lennon | 285/297 |
| 978,346 | 12/1910 | Yarrow | 285/294 |
| 1,251,973 | 1/1918 | Kurtz | 285/294 |
| 3,606,401 | 9/1971 | Schwarz | 285/294 |
| 4,445,715 | 5/1984 | Inoue et al. | 285/284 |
| 4,613,167 | 9/1986 | Okahashi et al. | 285/284 |
| 4,647,080 | 3/1987 | Sandt et al. | 285/297 |
| 4,828,294 | 5/1989 | Bounie et al. | 285/334 |

FOREIGN PATENT DOCUMENTS

| 202029 | 4/1939 | Switzerland . | |
| 260688 | 8/1949 | Switzerland | 285/297 |
| 9330 | of 1884 | United Kingdom | 285/297 |
| 2588 | of 1910 | United Kingdom | 285/297 |

Primary Examiner—Eric K. Nicholson
Attorney, Agent, or Firm—Barry R. Lipsitz

[57] ABSTRACT

To improve a joint connection comprising a first part and a second part which are fixed relative to one another by positive connection in a direction of load such that essentially no lumped loads occur, it is proposed that the first part and the second part each have an undercut extending transversely to the direction of load, that in a joining position the undercuts stand facing one another and in spaced relation to one another in the direction of load and thereby form between them a space containing a positive connection element which is introduced in a formable state into and cured in the space and hence lies which surface-to-surface contact on the undercuts, and that the positive connection element and the undercuts exerting a pressure load on it together form the positive connection.

12 Claims, 4 Drawing Sheets

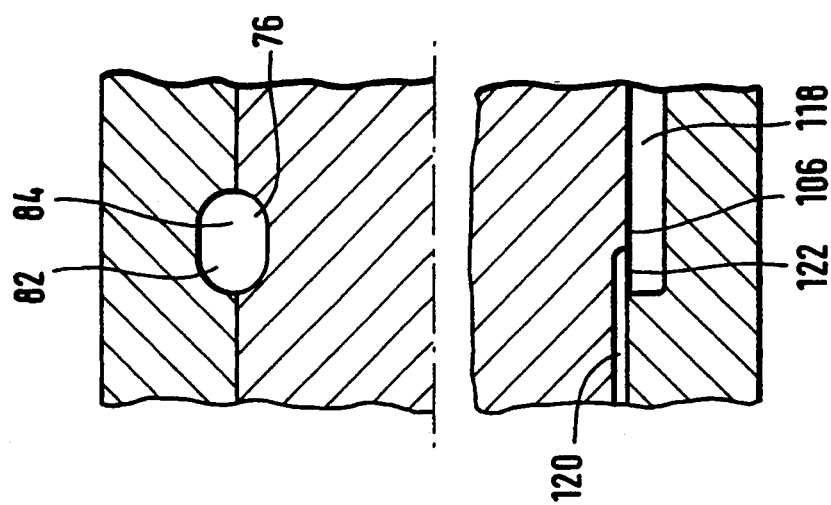
Fig. 7
Fig. 8
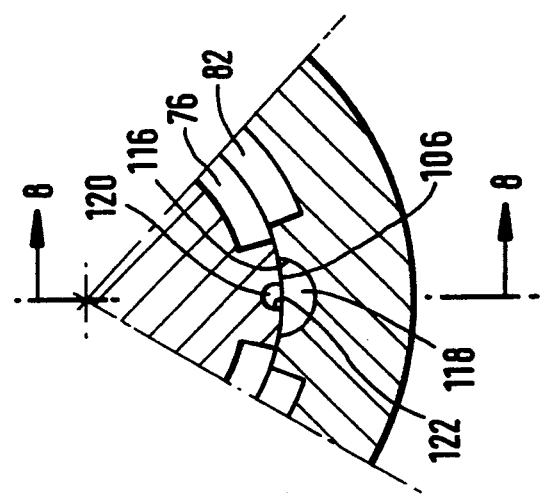
Fig. 6
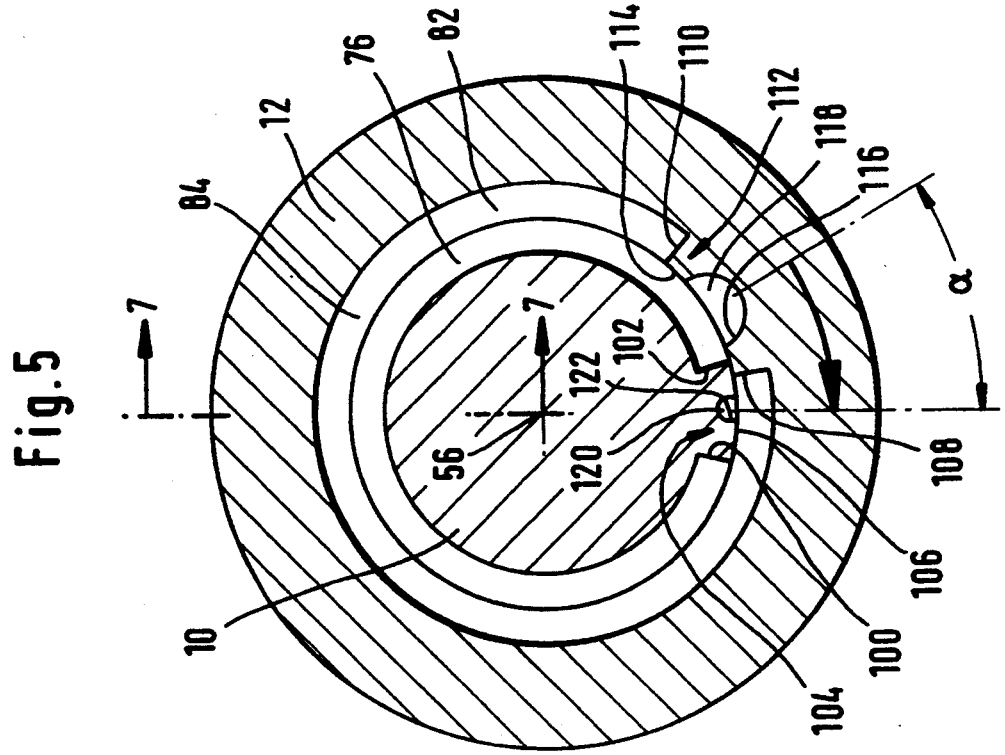
Fig. 5

JOINT CONNECTION

The invention relates to a joint connection comprising a first part and a second part which are fixed relative to one another by positive connection in a direction of load.

Such connections are known in large numbers where conventional materials are used.

However, problems arise in the implementation of such connections where non-conventional materials are used, in particular materials which are very brittle, for example, ceramic materials and, therefore, tend to break when lumped loads occur.

The object underlying the invention is, therefore, to so improve a joint connection of the generic kind that essentially no lumped loads occur.

This object is accomplished in accordance with the invention in a joint connection of the kind described at the beginning in that the first part and the second part each have an undercut extending transversely to the direction of load, in that in a joining position, the undercuts stand facing one another and in spaced relation to one another in the direction of load and thereby form between them a space containing a positive connection element introduced in a formable state into and cured in the space and hence lying with surface-to-surface contact on the undercuts, and in that the positive connection element and the undercuts exerting a pressure load on it together form the positive connection.

The advantage of the inventive solution is to be seen in the fact that the positive connection element is introduced into the space in a formable state, then enters into surface-to-surface contact with the undercuts, cures in this form and hence lies in the cured state with surface-to-surface contact on the undercuts so that there is no lumped loading on the undercuts by the positive connection element.

Furthermore, with this joint connection the positive connection element is essentially subjected to pressure and shear forces, which is advantageous for the positive connection element especially when ceramic materials are used as ceramic materials are highly resistant to pressure forces and shear forces but are not resistant to tensile forces.

A further advantage of the inventive solution is to be seen in the fact that the positive connection element introduced in a formable state offers the possibility of also compensating tolerances, particularly manufacturing and assembly tolerances, between the first and second parts, both in the direction of load and transversely to it. This means that the functionality of the joint is also ensured when the two undercuts are offset from one another in the axial direction.

It is particularly advantageous for the positive connection element to be made by introducing a substance in the liquid or plastic state into the space and allowing it to cure, preferably to a rigid inelastic body, in the space.

All conceivable kinds of material which can be worked in a liquid or plastic or viscose state and after the joining procedure can be transformed into a solid state by, for example, curing, sintering, solidifying, etc., can be used for the positive connection element. This also includes ceramic materials, powder materials (suspensions), plastic materials, metals such as, for example, low-melting alloys, etc.

On the one hand, provision is made for the substance to be a homogeneous substance consisting of the curable material. Within the scope of the invention, it is, however, also advantageous for the substance to comprise the curable material and, in addition, particles, in particular pellets and fibers, as filler.

The substance of the inventive positive connection element is advantageously selected or also modified such that in addition to a pure connecting function between the two parts it assumes further functions such as, for example, the thermal isolation of the two parts relative to one another by reduction of the heat transmission or absorption of heat in the form of a heat sink in the event of a correspondingly high thermal capacity or the establishing of an electrical connection between the two parts or the electrical isolation of the two parts from one another or the function of a breakage indicator.

Furthermore, as simplest solution within the scope of the invention, provision is made for the substance to be introduced directly into the space. Particularly if the space is not a closed-off cavity, it is advantageous for the substance to be surrounded by a preferably elastic enclosure, for example, an extendible tube, in order to prevent the substance from flowing out of the space before the curing.

Furthermore, it is advantageous for the positive connection element to be made of a material which in the cured state forms cracks which extend in crack planes which run transversely to the undercuts and essentially in the direction of load.

It is preferable for a division of the positive connection element into segments following one another in the direction transverse to the direction of load to be brought about by the crack formation.

In this case, the joint connection is also resistant to thermoshocks as the full carrying capacity of the positive connection element is maintained (redundancy) also with or just because of the occurrence of crack formation in the positive connection element owing, for example, to thermostresses.

In particular, the joint connection can compensate thermal expansions which occur within limits with large temperature differences and/or different thermal expansion coefficients of the materials used.

In a particularly preferred variant of the inventive solution, provision is made for the positive connection element to be made of ceramic material.

To simplify introduction of the positive connection element, provision is advantageously made for the space between the undercuts to be a closed cavity.

The cavity is preferably arranged so as to extend in a direction transverse to the direction of load along the undercuts.

Furthermore, the introduction of the material for the positive connection element is facilitated by a filling channel leading into the cavity through one of the parts for introduction of the positive connection element.

It is particularly advantageous for the filling channel to be closable. There are several possibilities for this. The simplest possibility would be to close the filling channel with a plug. However, it is more advantageous for the filling channel to be closable by movement of the first part relative to the second part, in particular when the substance has not yet cured, preferably by a rotational movement.

Such an embodiment is expediently implemented such that the filling channel is arranged in the one part and has an outlet opening in it which is closable by a counter-surface of the respective other part. The outlet opening of the filling channel can be the outlet opening of the filling channel into the space or an outlet opening which is arranged in the course of the filling channel and opposite which a second outlet opening of a further filling channel section is positionable for filling likewise by movement of the two parts relative to one another, with the second outlet opening being closable after the filling by the countersurface of the respective other part.

In an advantageous embodiment, provision is made for the positive connection element to be arranged as a force-exerting or connection element completely encapsulated within the two parts and hence protected from the outside environment. An assembly check on this "invisible connection" is preferably made with a corresponding overflow channel, and the space is to be regarded as filled when the substance emerges from the overflow channel.

With the inventive solution, it is, in principle, conceivable to arrange the undercuts such that they engage behind one another in the joining position and only the positive connection element between these ensures the surface-to-surface contact with each undercut. In this way, for example, axial tolerance compensation is possible.

However, it is more advantageous for the making of the joint connection for the cooperating undercuts not to engage behind one another in the joining position. It is preferable for the cooperating undercuts to be spaced from one another transversely to the direction of load.

With the inventive joint connection, it is essential that the parts be able to be brought in a simple way into the joining position. For this reason, provision is made in an advantageous embodiment for the first and second parts to be guided relative to one another such that the undercuts are movable past one another into the joining position in the direction opposite to the direction of load.

In order to achieve as uniform a distribution of the load as possible, provision is advantageously made for the first part and the second part to each be provided with two undercuts arranged in spaced relation to one another transversely to the direction of load and extending approximately parallel to one another.

The undercuts themselves can be implemented in a multiplicity of ways. One possibility of implementing the undercuts would be the provision of steps in the respective parts. However, it is particularly advantageous for the undercuts to be formed by a groove in the respective part.

A particularly high strength is achieved when the undercuts are formed on at least one of the parts by a groove which is closed in the circumferential direction.

It is advantageous for a least one undercut to be formed rotationally symmetrically in relation to an axis of rotation so that with precise machining of the undercuts, the parts joined together by the joint in accordance with the invention are rotatable relative to one another about the axis of rotation after curing of the positive connection element. In this case, the axis of rotation is preferably aligned parallel to the direction of load.

As an alternative to a rotationally symmetrical design of at least one undercut, it is likewise advantageous for the space receiving the positive connection element to be of varying cross-section and hence also the positive connection element with respect to its longitudinal extent so that torsional moments can also be compensated by the positive connection created by the positive connection element and the two parts are secured relative to one another against rotation.

As an alternative to this, it is likewise advantageous for the undercuts to have regions which are inclined in relation to planes which do not stand perpendicular on an axis of rotation of the two parts.

To achieve play-free fixing of the parts relative to one another, provision is advantageously made for the parts to be pretensioned by an elastic element in the direction of load.

Furthermore, the object underlying the invention is also accomplished in accordance with the invention by a method for securing by positive connection a first part relative to a second part against movement in a direction of load by the first part and the second part each being provided with undercuts extending transversely to the direction of load, by the undercuts being brought into a joining position in which they stand facing one another in spaced relation to one another in the direction of load and form a space, and by a formable positive connection element being introduced into the space and curing in the space and hence lying with surface-to-surface contact on the undercuts, the parts being joined by the positive connection element on which a pressure load is exerted to prevent movement in the direction of load.

Provision is preferably made for a substance to be introduced in the liquid or plastic state into the space to produce the positive connection element.

So far, nothing has been said about the curing of the substance. It is, for example, conceivable to start the curing procedure after joining of the two parts. Substances are, for example, conceivable which can be cured by heat, inductive coupling, ultraviolet radiation with transparent components or by directed absorption of sound waves.

As an alternative to this it is, however, also conceivable not to carry out a separate curing procedure but instead to select the substance such that it cures when the component is put into operation, i.e., for example, with the occurrence of a rise in temperature when the joined parts are put into use.

Furthermore, it is advantageous for the substance to form in the cured and loaded state cracks which lie in crack planes which essentially run approximately parallel to the direction of load and transversely to the undercuts.

It is particularly advantageous for the positive connection element to be made of a material which in the cured state is made to break up into segments following one another transversely to the direction of load.

Furthermore, it is particularly advantageous for the first part and the second part to be guided relative to one another such that the undercuts can be moved into the joining position in the direction opposite to the direction of load.

By using an electrophoretical liquid for the positive connection element, a temporary solidification or also transition states of the positive connection element can be achieved by applying an electric field (use, for example, in clutches, mechanisms, . . . ).

Owing to the fact that very different materials are, in principle, usable for the positive connection element, the joining principle can be applied in a multiplicity of ways without the joining partners having to unite with it materially. It enables a favorably priced, rapid, automatizable, damage-tolerant, reliable, play- and rattle-free connection for the joining of even very different materials and is thus destined for, for example, automobile construction and machine construction in general. It is precisely here that, e.g., also the diverse substitution of complicated snap-in connections and, in general, a further rationalization in the assembly are possible.

Owing to the usability of a ceramic positive connection element, the joining technique according to the invention is particularly well suited for high and highest temperature applications. As an example of use, above all, thermal protection systems of space vehicles, as required for re-entry into the atmosphere, should be mentioned here. Such hot structures usually have to be manufactured in segmented form from many individual parts (e.g. shingles in HERMES) made predominantly from fiber-ceramic materials. Here the invention would enable a rapid, damage-tolerant, reliable, favorably priced and very light (low mass) coupling to substructures.

Further features of the method according to the invention were already mentioned in connection with the joint connection according to the invention.

Furthermore, further features and advantages of the invention are the subject matter of the following description and the appended drawings of two embodiments.

Figure 2:
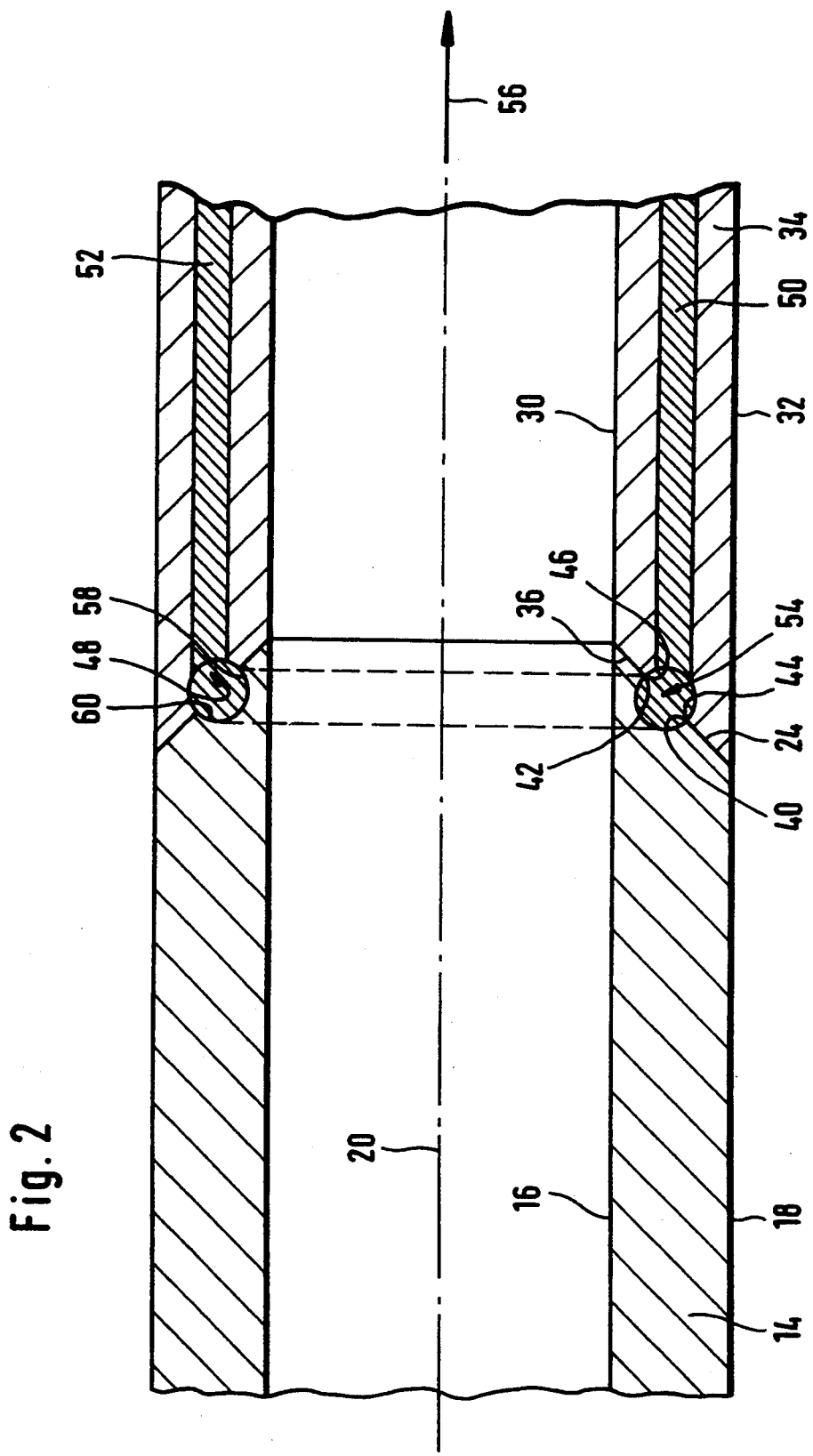
Figure 3:
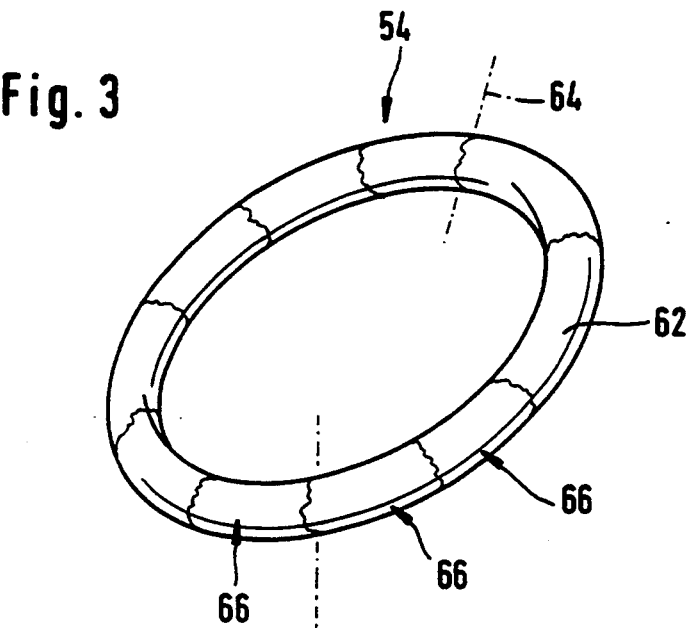
Figure 4:
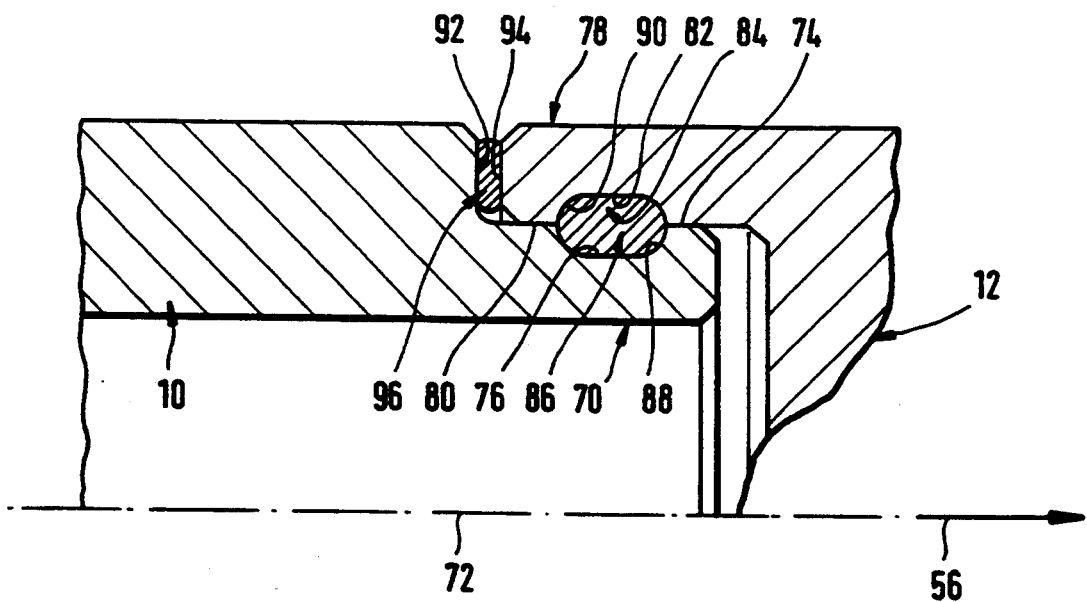

The drawings show:

FIG. 1 a longitudinal section through a first embodiment of an inventive joint connection in the unjoined position;

FIG. 2 a longitudinal section according to FIG. 1 with parts of the joint connection standing in the joining position;

FIG. 3 an illustration of a positive connection element in the cured state;

FIG. 4 a longitudinal section through a second embodiment of a joint connection according to the invention;

FIG. 5 a cross-section through a third embodiment of a joint connection according to the invention;

FIG. 6 a partial illustration of the cross-section in FIG. 5 with the filling channel closed;

FIG. 7 a section along line 7—7 in FIG. 5; and

FIG. 8 a section along line 8—8 in FIG. 6.

A first embodiment of a joint connection according to the invention, illustrated in FIG. 1, shows a first part 10 and a second part 12 which, as illustrated in FIG. 2, are joinable by positive connection in a joining position.

The first part 10 is of tubular design, i.e., it comprises a wall 14 which is delimited by an inner jacket 16 and an outer jacket 18 which are both arranged coaxially with a cylinder axis 20. At one end 22, the first part 10 is provided with an incline 24 which represents a ring-shaped section from the lateral area 25 of a cone which is likewise arranged coaxially with the cylinder axis 20 and has a cone angle α.

A circumferential annular groove 26 is machined in the incline 24. It extends in the wall 14, starting from the incline 24, with a semicircular cross-section.

The second part 12 is likewise of tubular design with an inner jacket 30 coaxial with the cylinder axis 20 and an outer jacket 32 and the wall 34 likewise lying between these.

An end 35 of the second part 12 facing the first part 10 is likewise provided with an incline 36 with a cone angle of 360-α and so the two inclines 24 and 36 can be brought into full surface-to-surface contact with one another.

There is also machined in the incline at the end 35 a circumferential annular groove 38 which extends in the wall 34 and is of semicircular cross-section.

The two annular grooves 26 and 38 are designed such that when the first part 10 and the second part 12 are standing in the joining position drawn in FIG. 2 in which the inclines 24 and 36 contact one another, both rims 40 and 42 of the annular groove 26 lying in the incline 24 are in contact with the two rims 44 and 46, respectively, of the annular groove 38 in the incline 36 and so the two annular grooves 26 and 38 delimit a cavity 48 of essentially round cross-section, half of which lies in wall 14 and the other half in wall 34.

Introducible into this cavity 48, as illustrated in FIG. 2, via filling channels 50 and 52 is, for example, a curable ceramic substance which cures in the cavity 48 as a ring with a shape corresponding essentially to the cavity 48 and forms a positive connection element 54 which is illustrated in isolation in the cured state in FIG. 3. This secures the two parts 10 and 12 against relative movement in a direction of load 56 extending parallel to the axis 20, together with the annular grooves 26 and 28, the annular groove 26 forming with its wall region facing the second part 12 an under-cut 58 and the annular groove 38 with its wall region facing the first part 10 an undercut 60, which in the joining position illustrated in FIG. 2 face one another and are spaced from one another in the direction of load 56 and hence define a space which is formed by the cavity 48, with the positive connection element 54 which prevents movement of the parts 10 and 12 relative to one another in the direction of load 56 lying in this space.

The inclines 24 and 36 serve as guide surfaces which prevent relative movement of the undercuts 58 and 60 transversely to the direction of load 56 and hence hold the first part 10 and the second part 12 in alignment in a defined position relative to one another transversely to the direction of load 56.

With the positive connection according to the invention made by the positive connection element 54 between the first part 10 and the second part 12, the positive connection element 54 thus lies with its toroidal surfaces 62 in surface-to-surface contact with the undercuts 58 and 60 and hence ensures fixing of the first part 10 relative to the second part 12 without lumped loads on the positive joint connection.

The positive connection element 54 is preferably in the form of a ceramic ring which cracks as a result of tensile stresses and vibrations and thereby forms cracks with crack planes 64 extending essentially transversely to the inclines 24 and 36 and in the direction of load 56 so that the positive connection element 54 breaks up into a plurality of toroidal segments 66, each individual one of which is immovably fixed in the cavity 48 by the adjacent toroidal segments 66 and, on the other hand, extends transversely to the direction of load 56 and hence prevents relative movement of the undercuts 58 and 60 in the direction of load 56.

A second embodiment of a joint connection according to the invention, illustrated in FIG. 4, likewise comprises a first part 10 and a second part 12 which are secured by positive connection against relative movement in the direction of load 56 in a manner according to the invention. To this end, the first part 10 is provided with an end section 70 which has an outer circumferential surface 74 which is cylindrical in relation to an axis 72 and in which a circumferential annular groove 76 is machined.

The second part 12 has an end section 78 with an inner circumferential surface 80 which is cylindrical in relation to the axis 72 and in which an annular groove 82 is likewise machined. The annular grooves 76 and 82 are arranged such that when the parts 10 and 12 are standing in the joining position, they face one another and hence delimit a cavity 84 in which a positive connection element 86 in the form of a ring lying in both annular grooves 76 and 82 is arranged for making the positive joint connection.

The positive connection element 86 is adapted in its cross-section to the shape of the annular grooves 76 and 82 and extends in both of these.

The annular groove 76 thus forms with its groove wall 88 facing the second part 12 an undercut, while the annular groove 82 likewise forms with its groove wall facing the first part an undercut 90 so that the positive connection element 86 lies on both with essentially surface-to-surface contact and thereby prevents relative movement of the parts 10 and 12 in the direction of load 56.

The positive connection element 86 is preferably constructed and designed in the same way as in the first embodiment and so reference is to be had in this connection to the statements, particularly regarding the crack formation, on the first embodiment.

In contrast with the first embodiment, the first part is additionally provided with an annular flange 92 which in the joining position faces an annular flange 94 of the second part 12. Arranged between both annular flanges 92 and 94 is an elastic element 96 which acts upon the first part 10 and the second part 12 in the direction of load 56 and hence holds both parts 10, 12 in a position in which the undercuts 88 and 90 lie free of play against the positive connection element 86.

In the third embodiment, the first part 10 and the second part 12 are of the same design as in the second embodiment with respect to the annular grooves 76 and 82, with the sole difference that neither the groove 76 nor the groove 82 is closed in the circumferential direction, but instead there lies between ends 100 and 102 of the annular groove 76 a wall segment 104 with an outer surface 106 which represents a continuation of the outer circumferential surface 74 in this region.

In the same way there likewise lies between ends 108 and 110 of the annular groove 82 a segment 112 with an inner surface 114 which faces the first part 10 and represents a continuation of the inner circumferential surface 80 in the region of the segment 112.

In this inner surface 114 there lies an outlet opening 116 of a filling channel 118 which in the position illustrated in FIG. 5 opens into the annular groove 76 beside the segment 104.

In this position, illustrated in FIG. 5, the cavity 84 is filled with the substance which will later form the positive connection element 86 in the liquid or plastic or viscose state. After the filling, the first and second parts 10, 12 are rotated relative to one another about the axis 56 so that the segments 104 and 112 stand over one another and the outlet opening 116 is closed by the outer surface 106. In this position, the filling channel 118 is also closed so that the substance for forming the positive connection element cannot escape from the cavity 84 and, in addition, is protected from outside influences such as, for example, chemical substances such as liquids, etc. penetrating through the filling channel 118.

To achieve as effective filling of the cavity 84 as possible, a degasification channel 120 is also provided. This leads with an opening 122 into the outer surface 106 and in the state illustrated in FIG. 5 enables gases to escape from the cavity 84 when it is being filled with the substance via the filling channel 118. In the position illustrated in FIG. 6, the degasification channel stands with its opening 122 opposite the outlet opening 116 and is thus likewise separated from the cavity 84 so that the substance is shielded from all outside influences in the cavity 84.

For a description of the parts bearing the same reference numerals as in the first and second embodiments, reference is to be had to the statements on these embodiments.

What is claimed is:

1. A joint connection for positively fixing first and second parts relative to one another in a load supporting direction, comprising:

a first undercut extending into a surface of said first part, said first undercut being adapted to align with a second undercut extending into a surface of said second part when said first and second parts are joined, the aligned undercuts extending into the surfaces of said first and second parts, respectively, in a direction that is not parallel to said load supporting direction and forming a space therebetween; and a plurality of consecutive connection element segments substantially filling said space, said connection element segments being formed from a material introduced into said space in a formable state and specifically selected to produce an inelastic connection element that will crack in a predetermined manner to form said segments when cured in said space in surface-to-surface contact with said undercuts;

wherein tensile stresses generated during the curing of said material cause cracks to form in said material, said cracks extending in crack planes which run transversely to said undercuts and substantially in said load supporting direction, said crack planes dividing said cured connection element into said plurality of consecutive segments which extend generally transversely to said load supporting direction to prevent relative movement of said undercuts in said load supporting direction.

2. A joint connection in accordance with claim 1 wherein said connection element material is introduced into said space in a liquid or plastic form prior to curing.

3. A joint connection in accordance with claim 1 wherein said space comprises a cavity that is closed after being filled with said connection element material.

4. A joint connection in accordance with claim 1 comprising a filling channel leading into said space through one of said first and second parts, said filling channel enabling the introduction of said connection element material into said space.

5. A joint connection in accordance with claim 1 wherein said surface of said first part having said first undercut and said surface of second part having said second undercut are arranged such that when aligned, they do not interfere with one another.

6. A joint connection in accordance with claim 5 wherein said undercuts, when aligned, are spaced from one another transversely to said load supporting direction.

7. A joint connection in accordance with claim 1 wherein said first and second parts are guided relative to one another such that said undercuts are moveable past one another into said aligned position.

8. A joint connection in accordance with claim 1 wherein said first and second parts are each provided with two undercuts arranged in spaced, substantially parallel relation to one another.

9. A joint connection in accordance with claim 1 wherein said undercuts each comprise a groove.

10. A joint connection in accordance with claim 1 further comprising an elastic element for pretensioning said first and second parts in said load supporting direction.

11. A method for securing first and second joined parts against movement in a load supporting direction comprising the steps of:

providing a first undercut in said first part and a second undercut in said second part, said first and second undercuts extending into the surfaces of said first and second parts, respectively, in a direction that is not parallel to said load supporting direction;

joining said first and second parts to bring said undercuts into alignment, said aligned undercuts forming a space therebetween;

introducing a formable connection material into said space in surface-to-surface contact with said undercuts, said material being specifically selected to produce an inelastic connection element with tensile stresses that will cause cracks in a predetermined manner to form a plurality of consecutive segments when cured in said space; and curing said connection material within said space, thereby obtaining said tensile stress;

wherein cracks extending in crack planes which run transversely to said undercuts and substantially in said load supporting direction are formed in said material, said crack planes dividing said connection material into said plurality of consecutive segments which extend generally transversely to said load supporting direction to prevent relative movement of said undercuts in said load supporting direction.

12. A method in accordance with claim 11, wherein said formable connection element is introduced into said space in a liquid or plastic state prior to said curing step.

* * * * *